United States Patent [19]

Van Doren

[11] Patent Number: 5,071,285

[45] Date of Patent: Dec. 10, 1991

[54] ARTIFICIAL REEF

[76] Inventor: David A. Van Doren, P.O. Box 1008, Hays, Kans. 67601

[21] Appl. No.: 500,070

[22] Filed: Mar. 26, 1990

[51] Int. Cl.⁵ ............................................. E02B 3/06
[52] U.S. Cl. ...................................... 405/25; 405/33; 405/35
[58] Field of Search ...................... 405/15, 21, 23, 24, 405/25, 29, 30, 33, 35

[56] References Cited

U.S. PATENT DOCUMENTS

| | | | |
|---|---|---|---|
| 1,500,119 | 7/1924 | Evers | 405/33 |
| 1,500,120 | 7/1924 | Evers | 405/33 |
| 2,069,715 | 2/1937 | Arpin | 405/23 |
| 2,384,207 | 9/1945 | Stoye | 405/33 |
| 2,474,786 | 6/1949 | Humphrey | 405/30 |
| 2,514,119 | 7/1950 | Boccia | 405/21 |
| 2,683,968 | 7/1954 | Budd | 405/33 |
| 2,827,769 | 3/1958 | Hunter | 405/33 |
| 3,100,953 | 8/1963 | Johnson | 52/563 |
| 3,176,468 | 4/1965 | Nagai et al. | 405/29 |
| 3,252,287 | 5/1966 | Suzuki | 405/29 |
| 3,724,221 | 4/1973 | Cool | 405/35 |
| 3,845,630 | 1/1974 | Karnas | 405/30 |
| 3,875,750 | 4/1975 | Campbell | 405/33 |
| 3,888,209 | 6/1975 | Boots | 119/1 |
| 4,341,489 | 7/1982 | Karnas | 405/35 |
| 4,388,019 | 6/1983 | Kajihara | 405/25 |
| 4,439,059 | 3/1984 | Kikuzawa et al. | 405/25 |
| 4,465,399 | 8/1984 | Kikuzawa et al. | 405/32 |
| 4,479,740 | 10/1984 | Schaaf et al. | 405/30 |
| 4,840,516 | 6/1989 | Rambo | 405/33 |
| 4,856,935 | 8/1989 | Haras | 405/35 |

FOREIGN PATENT DOCUMENTS

| | | | |
|---|---|---|---|
| 122906 | 9/1980 | Japan | 405/30 |
| 70707 | 3/1988 | Japan | 405/21 |
| 1101503 | 7/1984 | U.S.S.R. | 405/30 |
| 1247445 | 7/1986 | U.S.S.R. | 405/21 |
| 8911565 | 11/1989 | World Int. Prop. O. | 405/30 |

Primary Examiner—Dennis L. Taylor
Assistant Examiner—John Ricci
Attorney, Agent, or Firm—D. A. N. Chase

[57] ABSTRACT

An artificial reef is designed for replacing and protecting naturally occurring reef structures. The artificial reef comprises multiple vertically stacked concrete panels separated by spacing blocks. The panels and spacing blocks are fixed together by reinforcement rods which are held in place by epoxy grout. The concrete panels of the reef have a flat upper service and an under surface of a waffled configuration and are stacked in a manner to permit substantially all of the surface area to be exposed to the estuarine environment. The waffled configuration provides a complex shape to the reef and encourages both calm and turbulent water flow within the reef so as to avoid areas of water stagnation. The modular nature of the panels permits wide flexibility in size and shape of the reef. The use of concrete provides an inert, non-corroding composition of the reef and permits on shore construction of the reef. Lifting rings embedded in the top surface of the artificial reef permit deployment by a crane.

15 Claims, 4 Drawing Sheets

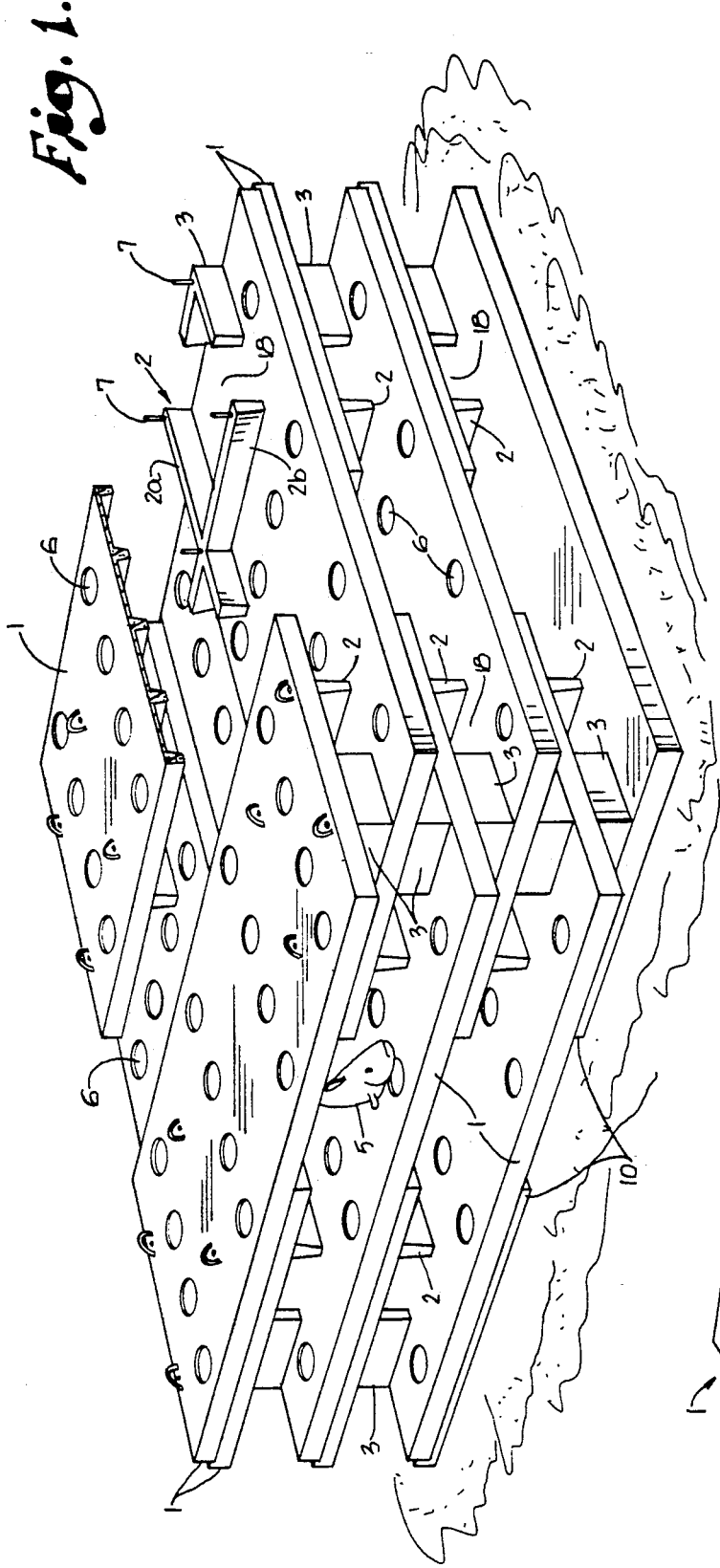

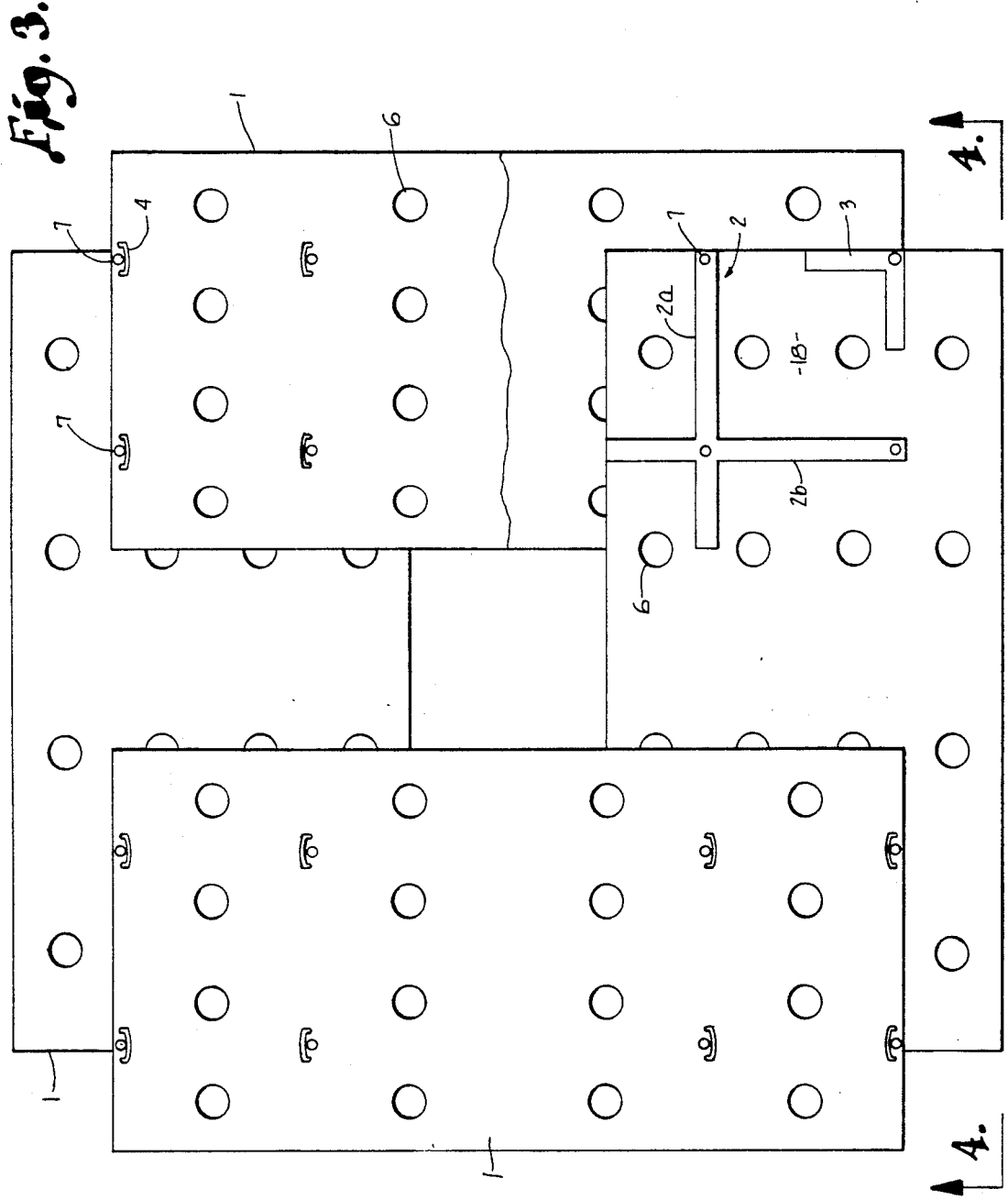

5,071,285

ARTIFICIAL REEF

BACKGROUND OF THE INVENTION

This invention relates to a structure for enhancing aquatic habitats for fish and mobile shellfish, and more specifically to an artificial reef which may be used to protect existing natural reefs or to substitute for damaged or destroyed natural reefs.

Currently more than fifty percent (50%) of the population of the United States resides in the coastal areas of the country. This increased population and concomitant increased use of the coastal environment has resulted in general degradation of the coastal marine environment and increased stress on the habitats of coastal aquatic life.

The coastal population in attempting to restrict the natural changes in the coastline has constructed barriers, such as seawalls, to limit the eroding action of waves on shoreline property. The installation of seawalls has caused an increase in the vertical force of wave action resulting from the abrupt limitation of the horizontal wave movement by seawalls as well as other man-made coastal barriers. This redirection of wave forces has caused the destruction of natural reefs and other aquatic habitats from the deposit of sand and other materials carried back out to sea by receding water currents. In addition, the increased recreational and fishing activity resulting from the coastal population increase has both heightened the demand for fish and shellfish while reducing the suitable habitat to sustain epibenthic colonization.

One means of reducing damage to natural reefs has been to erect structures between the reef and the shoreline so as to reduce the wave force effect upon natural reefs. These artificial reefs have generally consisted of large steel, stone or concrete barriers which serve to intercept the wave forces and protect natural reefs. Generally such artificial reefs have consisted of substantially solid barriers with openings so that seawater can move through the artificial reef with some freedom and yet be slowed so as to reduce the impact upon the natural reef areas. While presently available artificial reefs do provide a means to redirect wave forces and thus lessen the impact on natural reefs, they generally lack appropriate design features which are attractive to sea life for habitation and reproduction.

The lack of features in artificial reefs which are amenable to the habitat of coastal aquatic life narrows their utility to that of simple maintenance of existing natural reefs and generally does not contribute to an increase in habitat area or improvement of the coastal marine environment. More importantly, in coastal areas where natural reefs have been virtually destroyed presently available mechanical reefs fail to provide the complex shape desired by marine life for inhabitation. In addition if the mechanical reefs are constructed of wood or metal the deterioration of these substances in salt water can prove undesirable for long term inhabitation by marine life.

Therefore, an important object of the present invention is to provide a mechanical reef structure that provides a complex shape which encourages both calm and turbulent water flow while avoiding areas of water stagnation and through its complex shape provides a habitat suitable to aquatic life.

Another objective is to provide an artificial reef structure which provides a large amount of surface area suitable for colonization by marine life.

It is also an objective of the present invention to provide a cost effective artificial reef in terms of maximum exposed surface area per dollar invested.

Another objective is to provide design flexibility of the reef through use of modular design components which may be constructed either on the job site or at some distance and then rapidly deployed to the desired reef location.

It is also an objective of the present invention to provide a cost effective aquatic reef which is constructed of inert and non-corroding components that will neither harm the marine environment nor rapidly be destroyed by the corrosive effect of salt water.

Yet another objective of the present invention is to provide an artificial reef which may serve as either an optional aquatic habitat for marine life or which can provide protection for already existing natural reefs while increasing the suitable aquatic habitat in the vicinity of the natural reef.

A further objective of the present invention is to provide an artificial reef which may easily and conveniently be transported to and affixed in the selected site.

BRIEF DESCRIPTION OF THE DRAWINGS

The foregoing objects and other features and advantages of this invention will be apparent to those skilled in the art from the following detailed description taken in conjunction with the accompanying drawings in which:

FIG. 1 is a perspective view of one embodiment of the reef of the present invention incorporating a broken away view of a modular panel component revealing, in perspective view, the spacing blocks;

FIG. 2 is an inverted perspective view of one of the panel components used in FIG. 1, showing the voids in its underside;

FIG. 3 is a plan view of the embodiment of FIG. 1 incorporating a broken away view of the same panel to reveal in plan view the spacing blocks;

DETAILED DESCRIPTION

Figure 4:
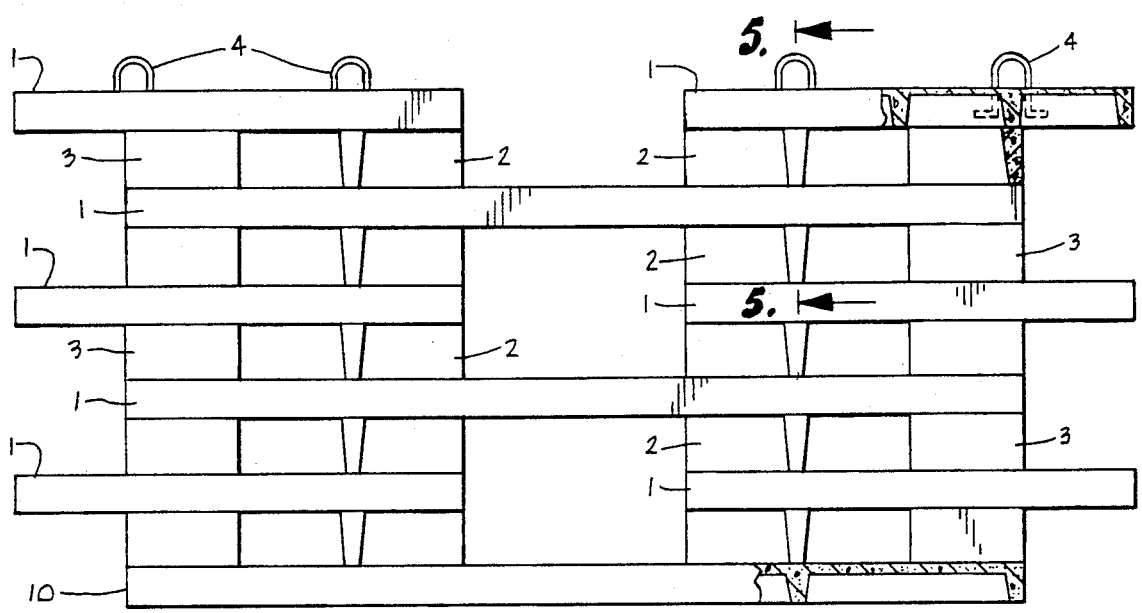
FIG. 4 is an elevational view of the embodiment of FIG. 1, revealing the placement of reef lifting devices.

Referring now to the drawings, FIG. 1 shows an artificial reef constructed according to the present invention. The reef is comprised of a plurality of panel components 1 of waffled configuration (one of which is shown in FIG. 2) stacked in a manner which permits substantially all of the surface area of the panels to be exposed to the estuarine environment. The number of panel levels employed will depend on the reef capacity desired. The large surface area provided by the artificial reef offers marine life the required stable surface upon which to attach and grow and be protected from the harsh wave forces which have contributed to the destruction of naturally occurring reef areas. The panels are typically spaced approximately twelve inches (30.5 cm.) apart in the vertical direction at the regions where they are separated by a plurality of primary and secondary spacing elements or blocks 2 and 3 which provide support for the panels while dividing the vertical separation area therebetween into a number of horizontally extending channels so as to offer an attractive environment for marine life 5.

The division of the area between the panel components as well as the provision of voids on the underside of each panel provide marine life with an environment which mimics that of natural rock and coral formations found along the coast line. In natural reef formations, the convolutions and crevices of the reef permit fish and other marine life to travel in and amongst the passages within the reef and there find shelter and food and suitable surroundings for reproduction.

Figure 5:
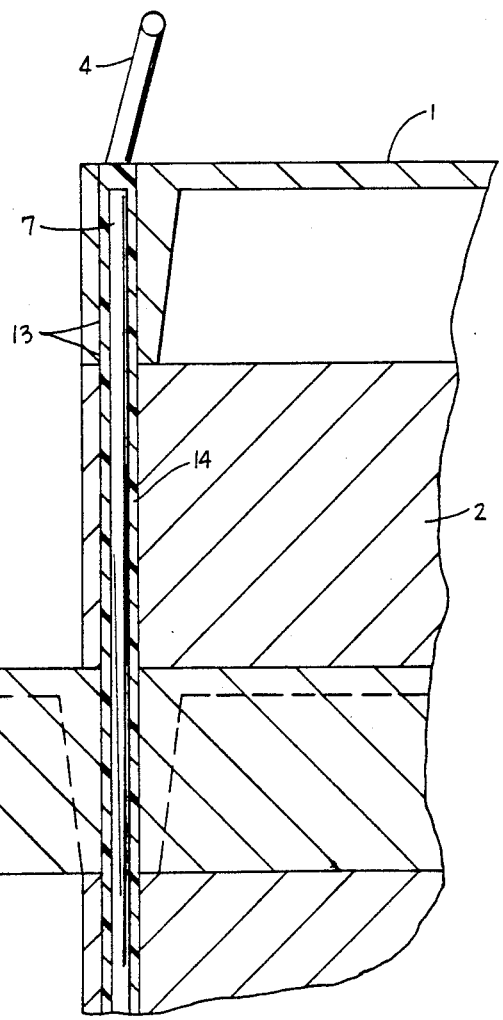
FIG. 5 is an enlarged, vertical cross sectional view of the reef taken along line 5—5 of FIG. 4, revealing the means of securing the individual panel components and support blocks.

In one embodiment of the reef, as shown in FIG. 1, five levels of panel components 1 are used, each level consisting of two coplanar, transversely spaced rectangular panels. Each panel level is vertically spaced apart from adjacent panel levels by the spacing blocks 2 and 3. The panels 1 and spacing blocks 2 and 3 are secured together by the insertion of reinforcement bars 7 cemented with a suitable adhesive such as epoxy grout as shown in FIG. 5.

A pair of base panel components 10 anchor the artificial reef to the underwater supporting surface and support the weight load of the artificial reef. The base panels, while substantially similar to the stacked panel units to be discussed below, have downwardly facing voids between their rib members of smaller area than the stacked panels 1 so as to increase the strength of the base panels.

In the embodiment of FIG. 1, the panel components 1 are stacked onto the base panels 10 such that the longitudinal axis of each successive panel level is oriented at 90 degrees with respect to the longitudinal axis of the preceding panel level. This arrangement of panels is best shown in FIG. 3. Such alternating orientation of the panels results in portions of each panel 1 being separated by a vertical distance of one spacing block 2 or 3 from the vertically adjacent panel and other portions of each panel being separated by a distance of two spacing blocks plus one panel thickness from other panels. This manner of stacking the panels adds to the structural complexity of the reef and provides additional habitat variety.

The particular configuration and arrangement of the spacing elements or blocks 2 and 3 also contribute to the quality f the environment provided by the artificial reef of the present invention. The flat edges of the panels 1 and the flat surfaces presented by the spacing blocks, perpendicular to horizontal current flow between the panel levels, provide turbulent flows as the water passes through the module. Relatively laminar flow occurs over the flat major surfaces presented by the panels. The regions between each pair of primary and secondary blocks 2 and 3 and inside panel voids 25 (to be discussed) provide calm areas of reduced current velocity. Accordingly, the reef module has calm areas while promoting both laminar and turbulent flows.

An examination of the cut away portions of FIGS. 1 and 3 reveals the manner in which the configuration of the primary and secondary spacing blocks 2 and 3 provides calm areas within the flow channels through the reef module. The primary block 2 is cross-shaped as viewed in plan and presents two primary arms 2a and 2b which form a right angle. The secondary spacing block 3 comprises a 90° angle element presenting inner, substantially vertical surfaces that face the surfaces presented by arms 2a and 2b. The cumulative effect of this arrangement is to provide a partially enclosed, essentially square region 18 between the blocks 2 and 3 where the water is calm and small marine life is protected.

Referring to FIG. 2, a typical waffle panel component 1 is constructed of precast reinforced concrete and is characterized by a relatively thin skin 20, thick structural sides 22 defining the periphery of the panel, and integral webs or ribs 24. The webs 24 are spaced apart at regular intervals to define voids 25 where the thickness of the panel resides solely in the skin 20. The presence of voids 25 provides a substantial saving of material and reduction in weight, without significant sacrifice of strength due to the presence of the structural webs 24 and sides 22. Typically, each panel is eight feet (2.44 m.) in its transverse dimension, sixteen feet (4.9 m.) long and eight inches (20.3 cm.) thick at sides 22 and webs 24. The panels 1 have a one inch (b 2.5 cm.) thickness for the skin 20, and a plurality of circular openings 6 through the skin 20 centered with respect to the rectangular voids 25 defined by the webs 24 and sides 22.

The base panels 10 are of substantially similar construction, however, the skin 20 of each base panel is typically two inches (5.1 cm.) thick and is without the plurality of openings 6 that are present in the panel components 1. The absence of openings in the base panels and additional skin thickness provides the base panels 10 with greater strength for supporting the stack of panel components 1.

The presence of openings 6 in the skins of the stacked panels 1 which are absent from the base panels 10 acts to provide a path for light and water flow and offer a means of escape from predators. The skin openings also aid in elimination of trapped air to ease placement of the reef module on the ocean floor.

Figure 6:
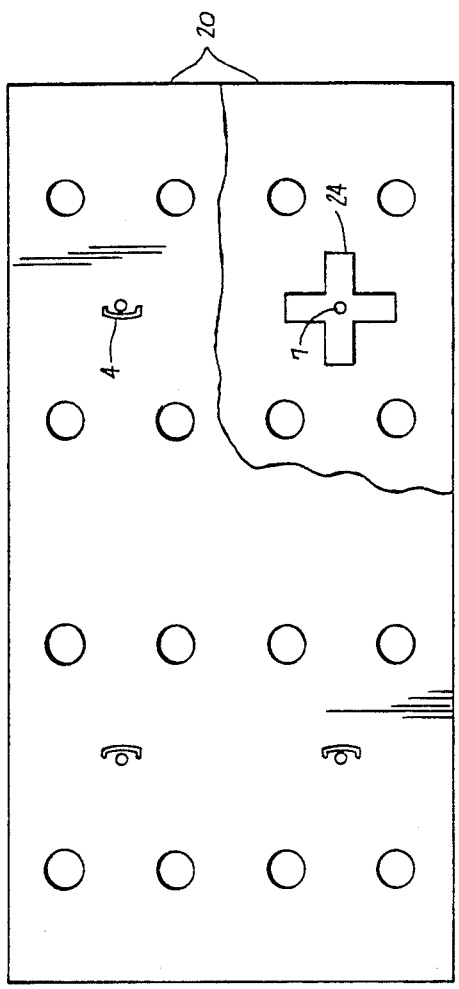
FIG. 6 is a plan view of a second embodiment of the reef of the present invention broken away to reveal a support block on a lower panel component.
Figure 7:
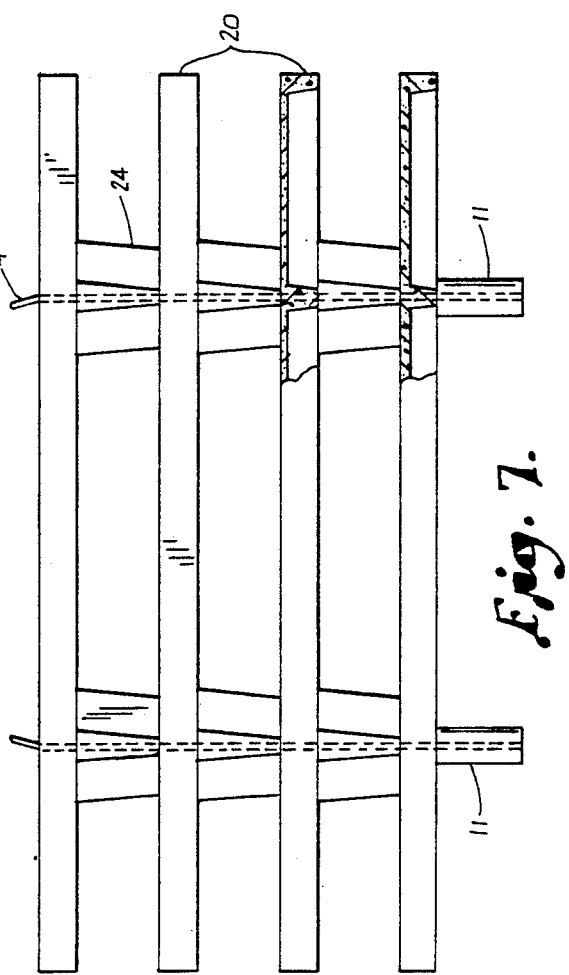
FIG. 7 is an elevational view of the reef of FIG. 6, broken away to reveal details of construction.

In a second embodiment of the reef, as shown in FIGS. 6 and 7, a plurality of panel components 20 similar to panel components 1, extending generally horizontally to the underwater support surface, are stacked in a vertically spaced relationship and separated by spacing elements or blocks 24, four such blocks 24 being employed between each adjacent pair of panels 20. In this embodiment the artificial reef is anchored in place by anchor feet 11 depending from the lowermost panel 20 and embedded in the underwater supporting surface by the weight of the artificial reef. The panel components 20 (a stack of four being illustrated), spacing blocks 24 and anchor feet 11 of this embodiment are secured together by the insertion of reinforcement bars 7 which pass through the panels and spacing blocks and anchor feet. The reinforcement bars are secured thereto by an adhesive such as epoxy grout.

Figure 8:
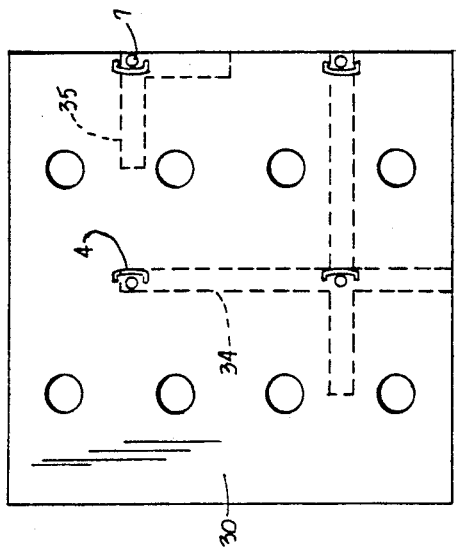
FIG. 8 is a plan view of a third embodiment.
Figure 9:
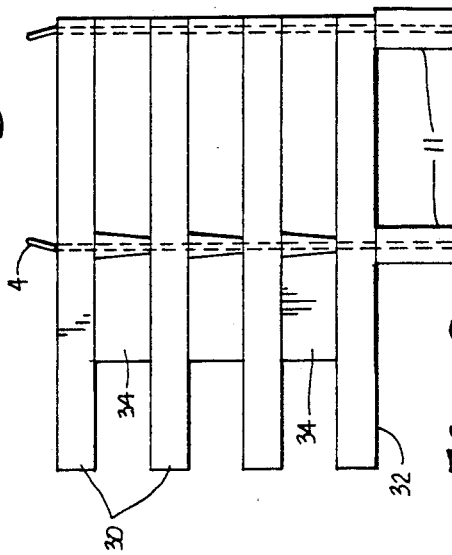
FIG. 9 is an elevational view of the embodiment of FIG. 8.

In a third embodiment of the artificial reef, as shown in FIGS. 8 and 9, a stack of square panel components 30 of reduced size are utilized. The upper three levels of panels 30 are supported in vertically spaced relationship by primary and secondary spacer elements or blocks 34 and 35 between each level, such elements 34 and 35 being of the same configuration as elements 2 and 3 in FIGS. 1, 3 and 4. The panels 30 are again generally horizontal to the underwater supporting surface, however, a portion of the panel module is cantilevered with respect to anchor feet 11 and presents an overhang 32 extending horizontally to the left of feet 11 as viewed in FIG. 9. This arrangement permits the entire artificial reef to be placed in close proximity to naturally occurring reefs and other underwater structures and thereby enhances their surface area for use by marine life. This embodiment may also serve as a means for protecting naturally occurring reefs which have been suffering deterioration from the impact of underwater wave forces against their surfaces. Utilization of the artificial reef in this manner can extend the life of naturally occurring reefs and offer the needed protection from underwater wave forces so as to permit regeneration of the natural reef.

The placement of lifting rings 4 is shown in detail in FIG. 4. The lifting rings are positioned atop the panel stack in all embodiments and adjacent to the locations at which reinforcement bars 7 have been inserted through the panel units and spacing blocks. In this manner connection points are provided for cranes and the like so that the weight of the entire artificial reef may be lifted and moved from the assembly point on shore to the off-shore site at which the reef is to be utilized.

Referring now to FIG. 5, the installation of one of the reinforcement bars 7 is shown in detail. As may be seen by examination of the drawing a reinforcement bar channel 13 has been provided for in each panel 1 as well as each spacing block 2 (and each base panel 10) so that the individual units comprising the artificial reef may be rapidly and conveniently assembled. Upon assembly of the reef waterproof adhesive 14 is placed in the channel 13 to secure the reinforcement bar 7 and the panel units and spacing blocks together.

Once assembled the entire artificial reef unit may be lifted by a crane or other suitable lifting device and placed on a barge for transport to the emplacement site. Upon arrival at the location for deployment, the reef is lifted from the barge and lowered into place.

It is to be understood that while certain forms of this invention have been illustrated and described, it is not limited thereto except insofar as such limitations are included in the following claims.

What is claimed and desired to be secured by Letters Patent is as follows:

1. An artificial reef comprising:
a plurality of generally horizontally extending panels, each of which has an undersurface presenting a number of downwardly facing voids, and also has a plurality of ribs intersecting one another to define a waffled configuration presenting said voids;
means for supporting said panels in stacked, vertically spaced relationship; and
means for anchoring the stacked panels to an underwater supporting surface.

2. The artificial reef as claimed in claim 1, wherein each of said panels has a skin presenting an upper surface thereof, said skin being integral with said ribs.

3. The artificial reef as claimed in claim 1, wherein each of said panels has a skin presenting an upper surface thereof, said skin being integral with said ribs and having a plurality of openings therethrough communicating with said voids.

4. The artificial reef as claimed in claim 1, wherein the means for supporting said panels includes a plurality of spacing elements therebetween.

5. The artificial reef as claimed in claim 4, wherein the spacing elements between adjacent panels are laterally spaced apart and configured to divide the vertical space between adjacent panels into a plurality of horizontally extending channels.

6. The artificial reef as claimed in claim 4, wherein said plurality of spacing elements includes a plurality of sets of said elements, each of said sets comprising a pair of laterally spaced blocks of angular configuration extending horizontally between adjacent panels and partially enclosing a region between the blocks, whereby to provide protected, calm water regions within the reef.

7. The artificial reef as claimed in claim 1, wherein said means for anchoring includes a plurality of projections adapted to contact the underwater supporting surface.

8. The artificial reef as claimed in claim 1, further comprising a plurality of lifting connectors on the top panel which permit the reef to be lifted and moved.

9. An artificial reef for underwater inhabitation by marine life comprising:
(a) a plurality of generally horizontally extending panels, each panel having a skin presenting an upper surface thereof and a lower surface integral with a series of ribs intersecting one another to define a waffled configuration presenting a number of downward facing voids;
(b) spacing blocks supporting said panels in stacked, vertically spaced relationship, and dividing the space between vertically adjacent panels into a plurality of horizontally extending channels; and
(c) means for anchoring the stacked panels to an underwater supporting surface.

10. The artificial reef as claimed in claim 9, wherein at least one of said panels has openings through its skin communicating with the voids thereof.

11. An artificial reef for underwater inhabitation by marine life comprising:
(a) a pair of horizontally spaced, elongated base panels each having a top face and a bottom face and extending generally parallel to one another with respect to the longitudinal axis of each panel;
(b) a first pair of horizontally spaced, elongated reef panels each having a top face and a bottom face and extending generally parallel to one another with respect to the longitudinal axis of each panel, and said first pair of reef panels being above and oriented generally orthogonal to the longitudinal axes of said pair of base panels;
(c) at least one additional pair of horizontally spaced, elongated reef panels each having a top face and a bottom face and extending generally parallel to one another with their longitudinal axes oriented at approximately 90 degrees with respect to the longitudinal axes of the adjacent pair of reef panels therebelow, the bottom face of each of said reef panels being provided with a plurality of intersecting ribs defining a waffled configuration that presents a number of downwardly facing voids; and
(d) adjacent pairs of said panels being spaced vertically apart by a plurality of spacing blocks defining horizontally extending channels within each of the vertical spaces bounded by the top face of a panel and the bottom face of an overlying panel of said pairs thereof.

12. An artificial reef comprising:
a plurality of generally horizontally extending panels, a plurality of spacing elements between said panels for supporting the panels in stacked, vertically spaced relationship, said plurality of spacing elements including sets thereof each comprising a pair of laterally spaced blocks of angular configuration extending horizontally between adjacent panels and partially enclosing a region between the blocks, whereby to provide protected, calm water regions within the reef, and means for anchoring the stacked panels to an underwater supporting surface.

13. The artificial reef as claimed in claim 12, wherein each of said panels has an undersurface presenting a number of downwardly facing voids.

14. An artificial reef comprising:

a plurality of generally horizontally extending panels, each of which has an undersurface provided with a plurality of generally horizontally extending ribs defining a configuration that presents a number of downwardly facing voids, and also has a skin presenting an upper surface thereof, said skin being integral with said ribs and having a plurality of openings therethrough communicating with said voids, means for supporting said panels in stacked, vertically spaced relationship, and means for anchoring the stacked panels to an underwater supporting surface.

15. An artificial reef comprising:

a plurality of generally horizontally extending panels, each of which has an undersurface presenting a number of downwardly facing voids, a plurality of spacing elements between said panels for supporting the same in stacked, vertically spaced relationship, said plurality of spacing elements including a plurality of sets of said elements, each of said sets comprising a pair of laterally spaced blocks of angular configuration extending horizontally between adjacent panels and partially enclosing a region between the blocks, whereby to provide protected, calm water regions within the reef, and means for anchoring the stacked panels to an underwater supporting surface.

* * * * *